United States Patent [19]

McVey

[11] 4,395,798

[45] Aug. 2, 1983

[54] METHOD OF PRODUCING A FLEMISH EYE ON THE END OF A ROPE AND A FLEMISH EYE DEVICE

[75] Inventor: John McVey, Airdrie, Scotland

[73] Assignee: Martin, Black & Co. Limited, Lanarkshire, Scotland

[21] Appl. No.: 261,975

[22] Filed: May 8, 1981

[30] Foreign Application Priority Data

May 8, 1980 [GB] United Kingdom ............... 8015212
Dec. 6, 1980 [GB] United Kingdom ............... 8039215

[51] Int. Cl.³ ............................................. F16G 11/00
[52] U.S. Cl. .................................................. 24/122.6
[58] Field of Search ............... 24/122.6, 122.3, 115 R, 24/115 M, 136 L, 136 K; 5/451

[56] References Cited

U.S. PATENT DOCUMENTS 3,409,951 11/1968 Morieras ........................... 24/122.6

Primary Examiner—Jay N. Eskovitz
Attorney, Agent, or Firm—Gerald J. Ferguson, Jr.; Joseph J. Baker

[57] ABSTRACT

In forming flemish eyes at the ends of wire ropes to produce e.g. slings, serious difficulties arise when forming the anchorage for the spliced loops if the rope is of large diameter. The terminal end of the rope material has its component strands naturally laid on the rope, and it has been proposed to enclose the naturally laid strands in a cylindrical sleeve adjacent to the loop and introduce a hardenable anchoring material such as a resin into the sleeve to complete the anchorage.

It is now found that improved loading distribution on a wire rope can be obtained through providing an anchorage for the loop in the form of a sleeve comprising a socket, and flaring-out into the socket the component wires of portions of the strands remote from the loop, the strand portions adjacent to the loop remaining naturally laid on the rope.

7 Claims, 7 Drawing Figures

VI—VI

V—V

METHOD OF PRODUCING A FLEMISH EYE ON THE END OF A ROPE AND A FLEMISH EYE DEVICE

This invention relates to the production of flemish eyes on the ends of ropes and is concerned more particularly with the formation of the flemish eye by a method comprising a length of rope material forming an extension of the rope to produce (a) a loop at an end of the rope and (b) a terminal length of the rope material lying along the rope, and securing the terminal length of rope material to the rope.

Usually, the secural of the terminal length of rope material to the rope is effected by laying the components of the terminal length of rope material naturally along the helical interstices of the rope, enclosing the laid components in a sleeve, and cold swaging the sleeve over the laid components. U.S. Pat. Nos. 2,357,733 and 4,215,463 represent exemplary disclosures of this technique.

With the rising commercial demand for the production of flemish eyes on the ends of large-diameter wire ropes—ropes say from 3½" (8.9 mm) to 12" (30.5 mm) in diameter, aforesaid method of secural is not normally feasible, as the cold swaging of sleeves of the required dimensions is not possible with the swaging presses normally available, and moreover the very high cold swaging pressures required with large sleeves causes undue stresses within and adjacent to the sleeve, with consequent weakening of the eye. Consequently all such terminations, generally coming under the heading of Ferrule Secured Eye Terminations (F.S.E.T.), must, under the relevant British Standard Specification, be proof loaded and the breaking strength of any such assembly should be not less than 90% of the minimum Breaking Load of the component rope.

Having regard to these problems with cold swaging, interest is now being shown in a previously proposed alternative method of secural consisting in introducing into the sleeve surrounding the naturally laid components of the terminal length of rope material an anchoring material which hardens in situ in the sleeve. Such a method is described in our British Pat. No. 1,130,336.

Commonly such anchoring material is used to join fitments to the ends of wire ropes, as is known, for example, from U.S. Pat. Nos. 2,347,229 and 3,507,949. Thus, the fitment includes a conical socket which houses flared-out or laterally spread components of a length of rope material forming an extension of the rope, and the anchoring material is introduced into the socket to secure the fitment to the rope. U.S. Pat. No. 3,507,949 also discloses the use as anchoring material of a cold-setting resin mixture based upon epoxy resins, polyester resins or acrylic resins, having thermally conducting metal powder such as aluminium homogeneously mixed therewith. The extra strong, reliable joint obtained by virtue of this flaring-out or lateral spreading within a conical socket is a most efficient method of termination, achieving the maximum rope breaking strength. Proof loading of the finished assembly is not required so that jointing on site e.g. in field operations in the offshore oil industry, is facilitated.

If in the production of flemish eyes the components of the terminal length of rope material to be anchored by hardenable material are flared-out from the rope instead of being laid naturally against the rope, it is found that the distortion caused by the flaring-out step adversely affects the strength of the eye.

The object of the present invention is to produce in a flemish eye, without adversely affecting the strength of the eye, an anchorage which has the advantages of a standard rope/fitment joint.

According to the present invention we provide a method of producing a flemish eye on the end of a rope, comprising using a length of rope material extending from the rope to produce (a) a loop at an end of the rope and (b) a terminal length of rope material extending along the rope, enclosing the terminal length in a sleeve, and introducing a hardenable anchoring material into the sleeve to secure the terminal length, characterised in that the sleeve includes a socket tapering towards the loop, and components of the end portion of terminal length remote from the loop are flared-out within the tapered socket.

By confining the flaring-out to an end portion remote from the loop, the geometry of the end portion adjacent to the loop is left undisturbed, thereby eliminating stress points at the crucial area of the junction between the loop and the rope. Thus all the advantages of providing flared-out material in a tapered socket are obtained without adversely affecting the strength of the eye.

Preferably the components of the end portion adjacent to the loop are laid along the helical interstices of the rope.

Preferably also the flared-out components of the rope material have a helical form assumed following unwinding thereof.

Preferably also the hardenable anchoring material is a polymeric material; a particularly efficacious polymeric material comprises a polyester resin/silica sand mixture. Such a polymeric material has a high shrinkage percentage on curing. It is found that while there is thus a low bonding effect, there is a very advantageous high friction effect which is enhanced by the presence of the silica sand. Moreover, with this shrinkage of the polymeric material, the contents of the sleeve are capable of slight movement under high load to wedge against the sleeve and thereby increase the friction effect still further.

In the event that the wire rope is an ordinary standard wire rope, the flared-out components of the rope material may be either strands or single wires.

In the event that the wire rope is a cable laid rope, the flared-out components of the rope material are the strands of the ropes of which the rope is composed.

Further according to the present invention there is provided a flemish eye device comprising a rope, a loop formation of rope material on an end of the rope and including a terminal length of the rope material extending along the rope, a sleeve enclosing the terminal length of rope material, and an anchoring material hardened in situ the sleeve, characterised in that a portion of the sleeve adjacent to the loop encloses rope material of terminal length engaging the rope and a portion of the sleeve remote from the loop encloses laterally spread components of the terminal length.

An embodiment of the invention will now be described by way of example with reference to the accompanying drawings in which.

Figures 1, 2:
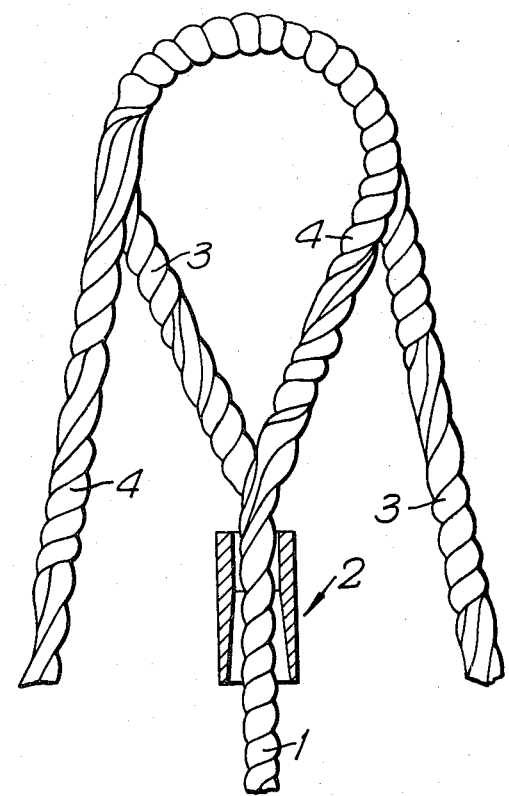
FIGS. 1 to 3 are fragmentary sectional views illustrating steps in the production of a flemish eye at an end of a stranded wire rope.
Figure 3:
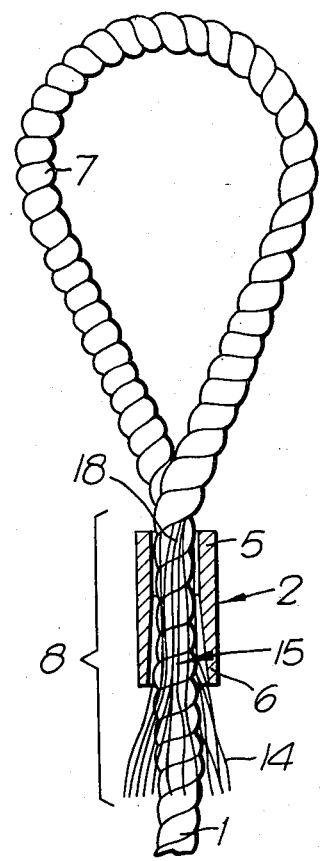
Figure 4:
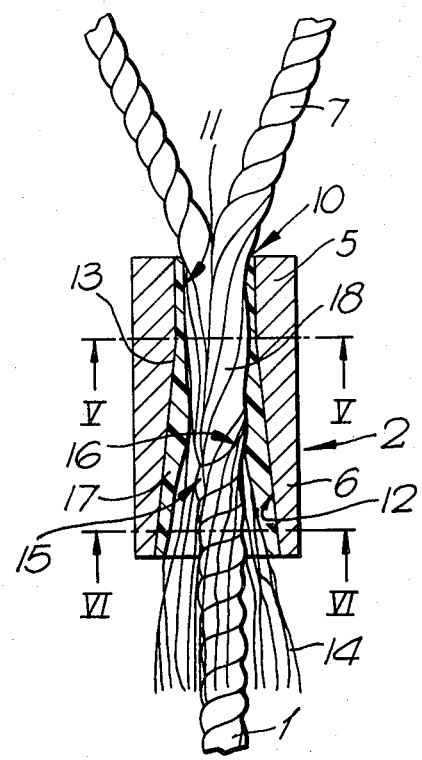
FIG. 4 is an enlarged fragmentary view of the eye anchorage of FIG. 3.
Figure 5:
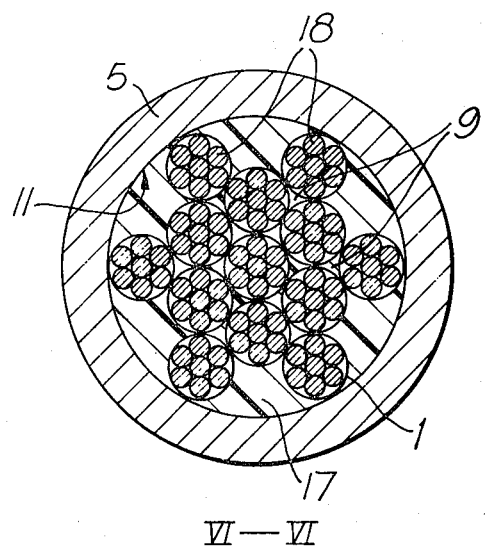
FIG. 5 is an enlarged cross-sectional view on the line V—V of FIG. 4.
Figure 6:
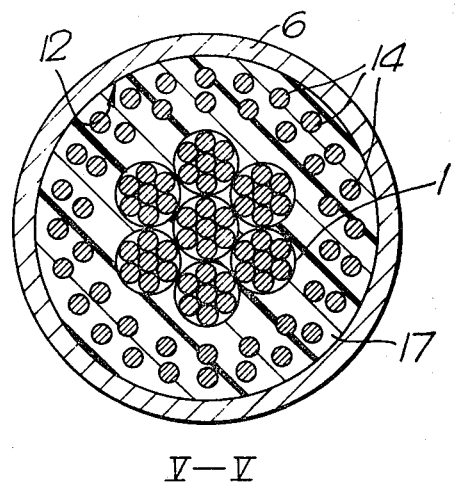
FIG. 6 is an enlarged cross-sectional view on the line VI—VI of FIG. 4.

Referring to the drawing:

A stranded wire rope 1 has threaded thereon a sleeve 2 and has extending from an end thereof a length of rope material comprising strands of the rope. These strands are divided into two groups 3 and 4 (FIG. 1). The groups 3 and 4 are laid back on each other in opposite directions (FIG. 2) to produce (a) a splice in the form of a loop 7 (FIG. 3) on the end of the rope 1 and (b) a terminal length 8 of rope material (FIG. 3) lying along the rope 1. The strands of which the terminal length 8 is composed are laid naturally along the helical grooves or interstices 9 of the rope 1 so that the geometry of the rope 1 is left undisturbed. The sleeve 2 is moved to a position in which one end thereof is at the junction 10 between the loop 7 and the rope 1, and in this position the sleeve 2 encloses the terminal length 8 which projects from the other end of the sleeve. The sleeve end portion adjacent to the loop 7 comprises a collar 5 having a cylindrical bore 11, and the sleeve end portion remote from the loop 7 comprises a socket 6 having a frustoconical bore 12 diverging from the end 13 of the bore 11. The wires 14 of the strands of the terminal length 8 are then untwisted and flared-out to form in the conical socket 6 an annular wire brush 15 which terminates at the junction 13 (FIG. 3) or alternatively terminates within the socket 6 at 16 (FIG. 4). The wires 14 are allowed to retain their helical shape and are distributed evenly within the conical socket 6.

A hardenable polymeric anchoring material 17 is then introduced into the sleeve 2 to fill the sleeve from end to end thereof and enter the interstices in the rope material in the sleeve. On setting of the polymeric material 17 the rope material is securely anchored in the sleeve 2, the helical shape of the wires 14 increasing the resistance of the wires to their withdrawal from the set polymeric material. The projecting ends of the wires 14 are trimmed off to complete the formation of the anchorage.

There is thus produced a flemish eye device whereof the anchorage embodies a socket-and brush arrangement which is on the lines of the well-established socket-and-brush joint used for connecting fitments to the ends of wire ropes and has all the advantages of such a joint. However, there is combined with this socket-and-brush arrangement a feature which ensures that the disturbance of the rope geometry caused by the formation of the wire brush does not affect the eye at the crucial junction 10 between the loop 7 and the rope 1. This feature consists in securing to the rope 1 by means of the anchoring material 17, strand lengths 18 laid naturally on the rope 1 and extending between the brush 15 and the junction 10. It is found that with this feature the strength of the flemish eye is not impaired by the provision of the brush-and-socket arrangement in the anchorage.

Figure 7:
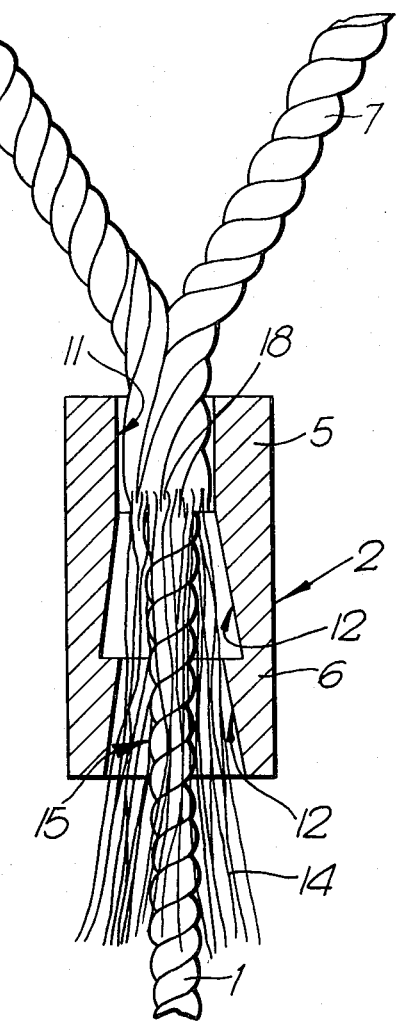
FIG. 7 shows a modification of the eye anchorage of FIG. 4.

Referring to FIG. 7, a larger cylindrical sleeve 2 has an end portion 5 comprising a collar having a cylindrical bore 11 and an end portion 6 comprising a socket having a pair of frusto-conical bores 12 arranged in series, each bore tapering towards the loop 7. The flaring-out of the wires 14 of the strands is such as to leave a length 18 of normally laid strands coextensive with the cylindrical bore 11. Thus additional resin can be introduced into the sleeve to ensure adequate encasement of the extra long wires 14 of the brush 15.

EXAMPLE

To produce a sling, spliced loops were made in the known manner on the ends of a 4" dia. (102 mm cable) laid wire rope having a wire rope core around which were helically laid six wire ropes.

The rope and the rope material extending from the ends of the rope were previously cleaned with a degreasing agent to remove all excess grease and oil.

A steel sleeve 16" (400 mm) long, having an inside diameter of 6¾" (168 mm) and an outside diameter of approx. 8" (204 mm) and comprising a tapered socket was placed around the terminal length of rope material laid along the rope adjacent to the loop.

The end of each sleeve adjacent to the loop was plugged with plasticine, and a polyester resin containing a silica sand as filler (Wirelock system) was mixed and poured into each sleeve to fill the sleeve completely. The resin gelled in 20 minutes, and one hour later the eyes were ready for testing. Before testing, the ends of the wires protruding beyond the ends of the sleeves were trimmed off level with the ends of the sleeves.

Slings embodying flemish eyes with different anchorage were tested with the following results:

| Rope Description | Actual Breaking Load | Minimum Breaking Load | Percent of Actual Breaking load |
| --- | --- | --- | --- |
| (1) 102 mm (4") dia. cable laid rope. Polyester-filled socketted sleeves. | 490 tonnes | 413 tonnes | 100% |
| (2) 52 mm (2") dia. standard rope. One eye with polyester-filled socketted sleeve, the other with pressed steel ferrule. | 157 tonnes | 174 tonnes | 90% Failure at pressed ferrule. |
| (3) 64 mm (2½") dia. standard rope. Polyester-filled socketted sleeves. | 284 | 262 | 100% |
| (4) 38 mm (1½") dia. standard rope. One eye with polyester-filled socketted sleeve, the other with pressed aluminium alloy ferrule. | 89 tonnes | 92.6 tonnes | 96% Failure at pressed alloy ferrule. |

Because of the nature of the polyester resin and filler system, it is temperature sensitive, i.e. at high temperatures it proceeds much more quickly and at lower temperatures much more slowly. Whereas the standard Wirelock system is acceptable at temperatures down to 55° F. (13° C.), booster packs are available to enable use at temperatures down to 48° F. (9° C.), (one booster pack) or at temperatures down 27° F. (−3° C.), (two booster packs).

I claim:

1. A method of producing a flemish eye on the end of a rope, comprising dividing strands of the rope and laying them over each other to form the required size of loop plus additional strand lengths, known as the tails, extending along the main body or standing part of the rope, enclosing in a ferrule the tails and that length of the main body or standing part of the rope along which the tails extend, and introducing a hardenable anchoring material into the ferrule to secure the rails to the main body or standing part of the rope, the ferrule, at an end portion adjacent the loop, comprising a collar having a cylindrical bore, and, at an end portion remote from the loop, comprising a socket having a frusto-conical bore diverging in the direction away from said cylindrical bore, the components of the tails adjacent to the loop being laid along the helical interstices of the main body or standing part of the rope and the components of the tails remote from the loop being flared-out within the diverging bore.

2. A method according to claim 1, wherein the flared-out components have a helical form assumed following unwinding thereof.

3. A method according to claim 1 or 2, wherein the hardenable anchoring material comprises a polyester resin/silica sand mixture.

4. A flemish eye device comprising a rope, a loop formed on an end of the rope by dividing strands of the rope and laying them over each other to form the required size of loop plus additional strand lengths, known as the tails, extending along the main body or standing part of the rope, a ferrule enclosing the tails and that length of the main body or standing part of the rope along which the tails extend, and an anchoring material hardened in situ in the ferrule, an end portion of the ferrule adjacent to the loop comprising a collar having a cylindrical bore and enclosing portions of the tails laid along the helical interstices of the main body or standing part of the rope, and an opposite end portion of the ferrule remote from the loop having a frusto-conical bore diverging in the direction away from the cylindrical bore and enclosing laterally spread portions of the tails.

5. A device according to claim 4, wherein the ferrule portion adjacent to the loop comprises a collar having a cylindrical bore, and the ferrule portion remote from the loop comprises a socket having a pair of frusto-conical bores arranged in series, each frusto-conical bore tapering towards the loop.

6. A device according to claim 4 or 5, wherein the laterally spread portions of the tails are of helical form.

7. A flemish eye device comprising a rope, a loop formed on an end of the rope by dividing strands of the rope and laying them over each other to form the required size of loop plus additional strand lengths, known as the tails, extending along the main body or standing part of the rope, a ferrule enclosing the tails and that length of the main body or standing part of the rope, along which the tails extend, and a polyester resin/silica sand mixture set in situ in the ferrule, an end portion of the ferrule adjacent to the loop comprising a collar having a cylindrical bore and enclosing portions of the tails laid along the helical interstices of the main body or standing part of the rope, and an opposite end portion of the ferrule remote from the loop having a frusto-conical bore diverging in the direction away from the cylindrical bore and enclosing laterally spread portions of the rails.

* * * * *